US006961371B2

(12) United States Patent
Wang et al.

(10) Patent No.: US 6,961,371 B2
(45) Date of Patent: Nov. 1, 2005

(54) CELLULAR COMMUNICATIONS SYSTEM RECEIVERS

(75) Inventors: Rui R. Wang, deceased, late of Ottawa (CA); by Chao Wang, legal representative, Ottawa (CA); Wen Tong, Ottawa (CA); Yuri S. Shinakov, Moscow (RU); Alexandre M. Chloma, Moskovskaja Oblast (RU); Mikhail G. Bakouline, Moskovskaja Oblast (RU); Vitali B. Kreindeline, Moscow (RU)

(73) Assignee: Nortel Networks Limited, St. Laurent (CA)

( * ) Notice: Subject to any disclaimer, the term of this patent is extended or adjusted under 35 U.S.C. 154(b) by 784 days.

(21) Appl. No.: 09/853,156

(22) Filed: May 11, 2001

(65) Prior Publication Data
US 2002/0039391 A1 Apr. 4, 2002

Related U.S. Application Data

(63) Continuation of application No. PCT/RU00/00181, filed on May 16, 2000.

(51) Int. Cl.[7] ................................................ H03H 7/30
(52) U.S. Cl. ....................... 375/229; 375/232; 375/326; 375/343; 375/354
(58) Field of Search ................................ 375/229, 232, 375/316, 326, 343, 354

(56) References Cited

U.S. PATENT DOCUMENTS 5,319,677 A    6/1994  Kim ........................... 375/100
5,960,039 A  *  9/1999  Martin et al. ................ 375/267
2003/0086515 A1 * 5/2003 Trans et al. ................. 375/346
2004/0101032 A1 * 5/2004 Dabak et al. ............... 375/143

FOREIGN PATENT DOCUMENTS

DE         19904059         2/1999       ............ H04L/1/20
WO       WO 97/08867    *  3/1997       ........... H04L/7/033

OTHER PUBLICATIONS

R. Dinis & A. Gusmão, "Adaptive Serial OQAM–Type Receivers For Mobile Broadband Communications", IEEEE, 1995, pp 200–205.

* cited by examiner

Primary Examiner—Jean B. Corrielus
Assistant Examiner—Guillermo Munoz

(57) ABSTRACT

An impulse response matrix of a received signal in a TDMA communications system is approximated using a plurality of indirect variables of a linear complex vector. The indirect variables are used for synchronizing to the received signal and for tracking and frequency offset estimation during successive samples of the received signal, the samples being equalized in dependence upon the indirect variables. A demodulated signal is derived from the equalized received signal samples. Individual synchronization and tracking units, and a single equalizer, can be provided for a two-antenna receiver. Tracking errors can be used to adapt a parameter of the equalizer to reduce interference in the received signal.

19 Claims, 4 Drawing Sheets

CELLULAR COMMUNICATIONS SYSTEM RECEIVERS

CROSS-REFERENCES TO RELATED APPLICATIONS

This application is a continuation of International Application No. PCT/RU00/00181, filed 16 May 2000.

This invention relates to cellular communications system receivers, and is particularly concerned with such receivers for use in mobile radio systems, such as TDMA. (time division multiple access) systems.

BACKGROUND

It is well known that it is necessary in a receiver of a cellular mobile radio system to recover each communicated signal under varying and challenging conditions. These conditions include, for example, the presence of multi-path signals and fading resulting in low signal-to-noise ratio (SNR), the presence of strong co-channel interfering (CCI) signals, and Doppler effects due to relative movement of the signal transmitter and receiver, as well as typical constraints due to factors such as limited channel bandwidth and equipment tolerances. In the case of a TDMA system, it is necessary to recover the timing and synchronize to the time division multiplex (TDM) frames and time slots of a received digital communications signal. It is also desirable to provide the receiver with the least possible cost and computational complexity.

International Publication Number WO 97/08867 dated division multiple access) systems. Mar. 6, 1997, in the name of Northern Telecom Limited and entitled "Timing Recovery And Frame Synchronization In A Cellular Communications System", discloses a method of timing recovery in which indirect variables of a linear complex vector are estimated using a maximum likelihood criterion in order to recover sampling delay and hence the timing and frame synchronization of the received signal.

There remains a need to provide improved receivers for cellular communications systems.

SUMMARY OF THE INVENTION

According to one aspect of this invention there is provided a method of processing samples of a received signal to produce a demodulated signal, comprising the steps of: representing an impulse response matrix for the received signal using a plurality of indirect variables of a linear complex vector; synchronizing to the received signal samples in dependence upon the indirect variables; tracking the indirect variables for successive received signal samples; equalizing the successive received signal samples in dependence upon the tracked indirect variables; and producing the demodulated signal in response to the equalized received signal samples.

Thus in accordance with this method the indirect variables track variations in distortions, such as delay, fading, and phase distortions, and their use is extended to signal processing steps for producing the demodulated signal, thereby facilitating an improved performance of the entire receiver of a communications system.

The received signal may in particular be a signal of a TDMA communications system, and the step of synchronizing to the received signal samples can comprise matched filtering the received signal samples to produce the plurality of indirect variables, and determining a maximum of a function of the indirect variables to determine synchronization. In a particular embodiment of the invention described below, there are four indirect variables and said function is a function of only two of the indirect variables.

The step of tracking the indirect variables for successive received signal samples can comprise recursively filtering initial values of the indirect variables, established during the synchronizing step, in dependence upon the successive received signal samples, and can also comprise a step of estimating frequency offset in dependence upon the successive received signal samples. This enables the tracking to be effective over time slots in a TDMA system operating at high frequencies, for example 2.4 GHz, despite rapid changes due to Doppler effects arising from relative movement between a transmitter and a receiver of the received signal.

The step of equalizing the successive received signal samples can comprise adaptively changing an equalizer parameter in dependence upon tracking errors for successive received signal samples to reduce co-channel interference with the received signal.

The method can advantageously be applied in a dual antenna receiver arrangement in which said indirect variables are produced and tracked individually in respect of samples of a received signal from each of two spaced antennas, received signal samples from the two antennas being combined and equalized in dependence upon a combination of the indirect variables in respect of the two antennas.

Another aspect of the invention provides apparatus for producing a demodulated signal from samples of a received signal, comprising: a synchronization unit responsive to the received signal samples for producing a linear complex vector comprising a plurality of indirect variables having initial values corresponding to a synchronized state; a tracking unit responsive to the initial values of the indirect variables and to the received signal samples to produce tracked values of the indirect variables for successive received signal samples; an equalizer responsive to the tracked values of the indirect variables to equalize successive received signal samples; a feedback path from the equalizer to the tracking unit to facilitate producing the tracked values of the indirect variables by the tracking unit; and a demodulator responsive to the equalized received signal samples to produce a demodulated signal.

The synchronization unit can comprise a plurality of finite impulse response filters for matched filtering of the received signal samples to produce the plurality of indirect variables. The tracking unit can comprise a recursive filter for recursively filtering the indirect variables in dependence upon the successive received signal samples.

The apparatus can also include a frequency offset estimator coupled to the tracking unit for modifying the tracking of the indirect variables in accordance with estimated frequency offset in dependence upon the successive received signal samples.

For reducing co-channel interference, the apparatus advantageously includes a unit, responsive to tracking errors determined by the tracking unit for successive received signal samples, for estimating an interference correlation matrix to adaptively change a parameter of the equalizer.

The apparatus can include respective synchronization and tracking units for samples of a received signal from each of two spaced antennas, the equalizer being responsive to the tracked indirect variables for both antennas to combine and equalize the received signal samples from the two antennas.

BRIEF DESCRIPTION OF THE DRAWINGS

The invention will be further understood from the following description by way of example with reference to the accompanying drawings, in which.

DETAILED DESCRIPTION

Figure 1:
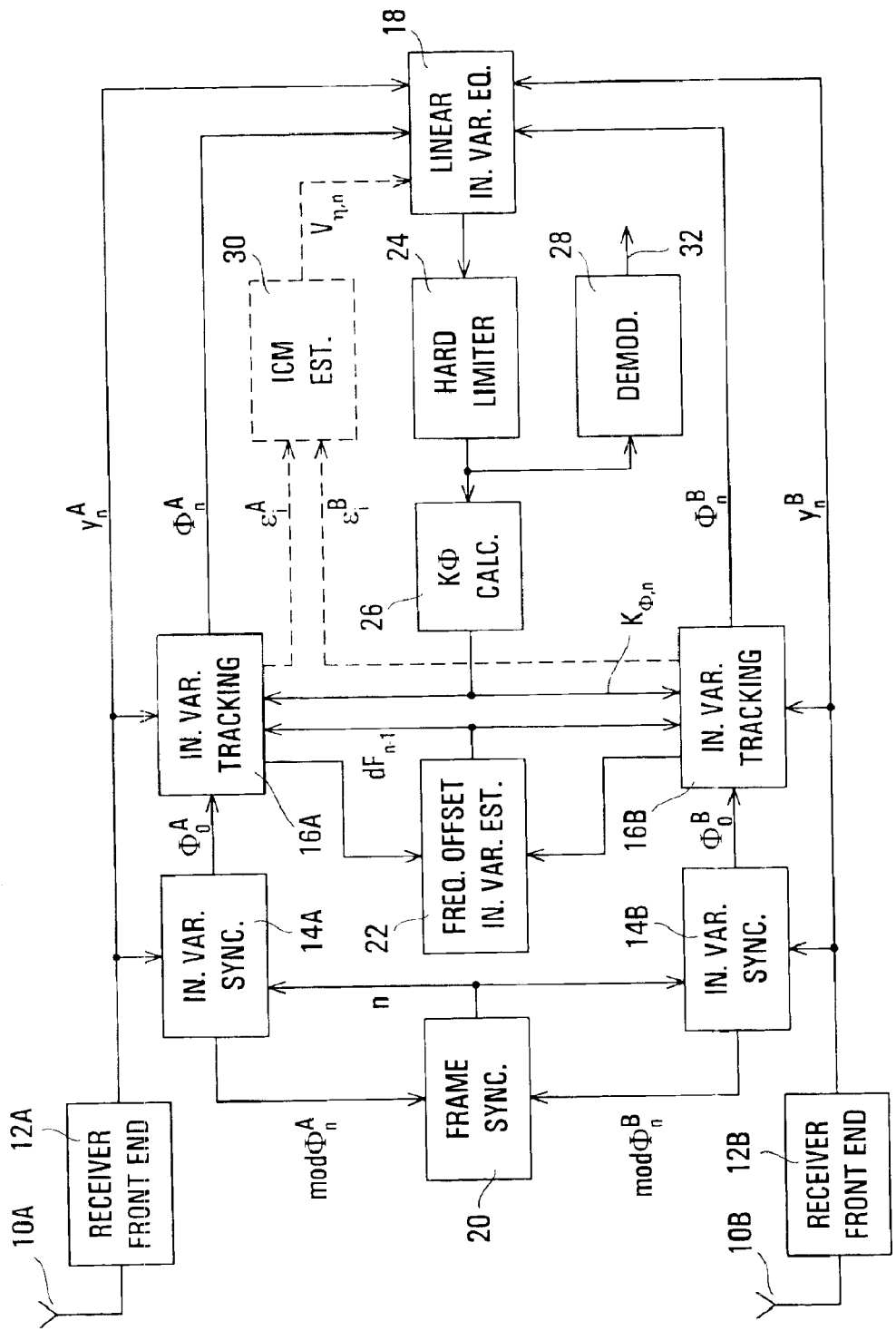
FIG. 1 schematically illustrates a dual antenna TDMA cellular radio system receiver using indirect variables in accordance with an embodiment of the invention.

Embodiments of the invention are described below in the context of a receiver for use in a TDMA cellular system compatible with EIA/TIA document IS-54-B: Cellular System Dual Mode Mobile Station—Base Station Compatibility Standard (Rev. B) and later documents referred to as IS-136 and IS-136+, minimum performance standards for which are specified in a document referred to as IS-138. For brevity, this is referred to below simply as the TDMA system and the IS-54 standard. However, the principles of the invention are also applicable to other TDMA systems and to other types of communications system receiver.

Such a TDMA system requires a receiver having a high performance for operation in various radio channel conditions which include a frame duration of 20 ms, a channel bandwidth of 30 kHz, a multi-path delay spread of up to 42 $\mu$s (one TDMA symbol) with equal powers of the multi-path signals, Doppler frequency up to 200 Hz, and the presence of up to 3 strong co-channel interference signals. The receiver is desired to provide the best possible sensitivity and multi-path fading reception, despite these conditions, with the least possible computation complexity and cost.

It is well known to enhance reception of radio channels subject to fading by using two (or more) spaced antennas whose respective receive path signals are combined in a desired manner, and the first embodiment of the invention described below relates to a dual antenna receiver arrangement. However, the invention is also applicable to a single antenna receiver, as described later below.

Despite the use of two antennas, a design of receiver for operation in the various conditions outlined above presents a significant challenge. As indicated above, one such design described in publication WO 97/08867 makes use of indirect variables to recover timing and frame synchronization of the received signal.

As described in that publication, each component of an impulse response matrix G($\tau$) is approximated by a linear combination, plus a constant term, of a pair of functions $\phi_1(\tau)$ and $\phi_2(\tau)$. Several examples of function pairs are given. This leads to introduction of a variable $\Phi_n$ which is a 3-dimensional complex vector constituted by the transpose of three indirect variables $\phi_{1,n}$, $\phi_{2,n}$, and $\phi_{3,n}$, which are used in the processes of timing recovery and frame synchronization. The recovered timing and synchronization parameters are then used in conventional manner for deriving the content of the received signals.

The present invention also uses indirect variables, but does not merely use them for timing recovery and frame synchronization. Rather, the invention recognizes that parameters such as the sample timing and frame synchronization are only means to the end of recovering the content of the received signal, and that these parameters do not necessarily provide any value for themselves. Instead, the invention makes use of indirect variables substantially throughout the entire receiver, and then recovers the content of the received signal from the indirect variables at the demodulator. This facilitates achieving an improved receiver performance. In particular, as described further below, the indirect variables can be used in tracking channel changes, Doppler and other frequency offsets, providing equalization, and also in reducing the adverse effects of co channel interference.

Referring to FIG. 1, which illustrates a dual antenna TDMA system receiver using indirect variables in accordance with an embodiment of the invention, two spaced antennas 10A and 10B are coupled to respective receiver front end units 12A and 12B, each of which includes a radio frequency receiver, down converter, sampler, and analog-to-digital converter of known form to provide at its output digital complex signal samples $Y_n^A$ and $Y_B^B$, the subscript n denoting the sample number and the superscript A or B denoting the antenna. These signal samples are supplied to a respective one of two indirect variable (IN. VAR.) synchronization units 14A and 14B, to a respective one of two independent variable tracking units 16A and 16B, and to a linear independent variable equalizer 18 of the receiver of FIG. 1.

The receiver of FIG. 1 also includes, commonly for the signals of the two antennas, a frame synchronization unit 20, a frequency offset indirect variable estimator 22, a hard limiter 24, a K$\Phi$ calculation unit 26, and a demodulator 28. Signal connection among these various units of the receiver are shown in FIG. 1 and are further described below. In addition, the receiver can optionally include an interference (correlation matrix (ICM) estimation unit 30 which is shown with its connections in dashed lines in FIG. 1.

In order to understand the further description below, it is expedient to consider a mathematical background which leads to such understanding. This consideration is for a two-path signal model in an IS-54 TDMA system, in which as is well known signals are communicated using $\pi/4$-shifted DQPSK (differential quadrature phase shift keyed) signal symbols in non-overlapping time slots each of which comprises data symbols, known synchronization symbols (sync word), and known CDVCC symbols. The known symbols, in particular the sync word, facilitate determination and tracking of parameters of the signal received during the time slot, these parameters including for example carrier phase which can vary during the lime slot.

With sampling as is usual at twice the clock frequency, a discrete observation model for the received signal samples has the form:

$$y_i = \sum_{k=0}^{M} u_i^1 s_k g\left(\frac{iT}{2} - \tau_1 - kT - \frac{T}{2}\right) + \sum_{k=0}^{M} u_i^2 s_k g\left(\frac{iT}{2} - \tau_2 - kT - \frac{T}{2}\right) + \eta_i \quad (1)$$

where $Y_i$ is the complex observation sample, i denotes the sample number from 1 to 2N+1 in the observed data sequence, $S_k$ are the known complex symbols in the sync word of M symbols, $$u_i^m = \sqrt{P_i^m} \exp(j\psi_0^m)$$

are unknown complex amplitude-phase multipliers for the different independently fading paths m=1 and m=2, the samples i on each path m having power $p_i^m$ and the average power of each path being half the average signal power, T is the symbol spacing or clock frequency period, $\tau_1$ and $\tau_2$ are unknown delays of the two paths, g(t) is the impulse response of concatenated transmitter and receiver filters, given by:

$$g(t) = \left(\frac{\sin(\pi t/T)}{\pi t/T}\right)\left(\frac{\cos(\alpha \pi t/T)}{(1-(2\alpha t/T)^2)}\right)$$

where $\alpha$ is the filter roll-off coefficient, and $\eta_i$ is a noise sequence of complex Gaussian random variables with zero mean, variance $2\sigma_\eta$, and correlation function $2\sigma_\eta g(((i-j)T)/2)$ between two random variables $\eta_i$ and $\eta_j$.

The channel model of Equation (1) can be written in the form:

$$y_i = \sum_{k=0}^{M} U_i^1 \tilde{s}_k g\left(\frac{iT}{2} - \tau_1 - kT - \frac{T}{2}\right) + \sum_{k=0}^{M} U_i^2 \tilde{s}_k g\left(\frac{iT}{2} - \tau_2 - kT - \frac{T}{2}\right) + \eta_i \quad (2)$$

where $$U_i^m = u_i^m s_M$$

are the amplitude-phase multipliers during the sync word and $\tilde{S}_k = S_k(S_M)'$ are transformed symbols of the sync word. Assuming that the amplitude-phase multipliers are constant during the sync word, then Equation (2) can be rewritten in matrix form as:

$$Y_n = G(\tau_1)SU_n^1 + G(\tau_2)SU_n^2 + H_n \quad (3)$$

where $Y_n=[y_{2n-1}\ y_{2n}\ \ldots\ y_{2n+2N-2}\ y_{2n+2N-1}]^T$ is a (2N+1)-dimensioned observation vector, $H_n=[\eta_{2n-1}\eta_{2n}\ \ldots\ \eta_{2n+2N-2}\eta_{2n+2N-1}]^T$ is a (2N+1)-dimensioned vector of correlated noise samples, $S=(s_m)'[s_0 s_1 \ldots s_{M-1}s_M]^T$ is an (M+1)-dimensioned vector of known symbols, and $G(\tau)$ is the impulse response matrix given by:

$$G(\tau) = \begin{bmatrix} g(-\tau) & g(-\tau-T) & \ldots & g(-\tau-MT) \\ g(-\tau+T/2) & g(-\tau-T/2) & \ldots & g(-\tau+T/2-MT) \\ g(-\tau+T) & g(-\tau) & \ldots & g(-\tau-(M-1)T) \\ \ldots & \ldots & \ldots & \ldots \\ g(-\tau+NT) & g(-\tau+(N-1)T) & \ldots & g(-\tau+(N-M)T) \end{bmatrix}$$

According to the IS-54 standard, $$\tau_i \in (-L_{pr}T/2; L_{pr}T/2)\ i=1,2\ |\tau_1-\tau_2| < T$$

where $L_{pr}$ is the number of sample spacings in an uncertainty range of delay, abbreviated below to L. With this uncertainty range determined to be L=2 (path delays within two sampling intervals), then to ensure that the sync word symbols are all within an observation set the above impulse response matrix must be increased by two initial rows and two final rows, so that with N=M it becomes a matrix with 2M+5 rows and M+1 columns with components $G_{ij}$=g(−τ+(i−1−L)T/2−(j−1)T) where i is a row index from 1 to 2M+5 and j is a column index from 1 to M+1.

In publication WO 97/08867 an approximation $g(\tau+iT/2) \equiv a_{1,i\varphi 1}(\tau)+a_{2,i\varphi 2}(\tau)+a_{3,i}, i=\ldots -2,-1,0,1,2,\ldots$ or, in matrix form, $G(\tau) \equiv A_{1\varphi 1}(\tau)+A_{2\varphi 2}(\tau)+A_3$ is used for a single path channel to approximate the impulse response matrix $G(\tau)$, where $a_{1,i}$, $a_{2,i}$, and $a_{3,i}$ are approximation coefficients and $A_1$, $A_2$, and $A_3$ are approximation matrices with these coefficients. This approximation is reasonable for values of the variable $\tau$ within the interval [−T/2; T/2], but is not sufficient for two paths for which, with frame synchronization established, the uncertainty range is still [−3T/2; 3T/2]. A good accuracy with this greater interval has been found with four terms, i.e.:

$$g(\tau+iT/2) \equiv a_{1,i\varphi 1}(\tau)+a_{2,i\varphi 2}(\tau)+a_{3,i\varphi 3}(\tau)+a_{4,i\varphi 4}(\tau) i=\ldots -2,-1,0,1,2,\ldots$$

or $G(\tau) \equiv A_{1\varphi 1}(\tau)+A_{2\varphi 2}(\tau)+A_{3\varphi 3}(\tau)+A_{4\varphi 4}(\tau)$ \quad (4)

Various approximation functions can be used to provide a desired approximation accuracy, and the invention is not limited to any particular set of approximation functions. As one example, the approximation functions may be:

$\varphi_1(\tau)=\sin(\pi\tau/2T)$ $\varphi_2(\tau)=\cos(\pi\tau/2T)$ $\varphi_3(\tau)=\sin(\pi\tau/4T)$ $\varphi_4(\tau)=\cos(\pi\tau/4T)$ As another example, the approximation functions may be:

$\varphi_1(\tau)=g(\tau)$ $\varphi_2(\tau)=\tilde{g}(\tau)$ $\varphi_3(\tau)=-1.22\ g(\tau)+g(\tau/2)$ $\varphi_4(\tau)=-\tilde{g}(\tau)+1.41\ \tilde{g}(\tau/2)$ where $\tilde{g}(\tau)$ is the Hilbert transform of the function g(t). These approximation functions provide a signal-to-approximation noise ratio of about 30 dB in a range of $\tau$ from −T to T. As can be appreciated, a preferred set of approximation functions, and the number of functions in the set, depends on the desired approximation accuracy (signal-to-approximation noise ratio) and directly affects the resulting complexity of implementing the approximation functions in the receiver.

Because the difference in delays between the two paths is not more than one symbol spacing interval, Equation (3) above can be rewritten, using the approximation functions, in the form:

$$Y_n=A_1 S(\varphi_1(\tau_1)U_n^1+\varphi_1(\tau_2)U_n^2)+A_2 S(\varphi_2(\tau_1)U_n^1+\varphi_2(\tau_2)U_n^2)+$$
$$A_3 S(\varphi_3(\tau_1)U_n^1+\varphi_3(\tau_2)U_n^2)+A_4 S(\varphi_4(\tau_1)U_n^1+\varphi_4(\tau_2)U_n^2)+H_n \quad (5)$$

If a 4-dimensioned vector $\Phi_n$ of indirect variables is defined by:

$$\Phi_n \equiv (\varphi_{1,n},\ \varphi_{2,n},\ \varphi_{3,n},\ \varphi_{4,n})$$

where $$\varphi_{i,n}=\varphi_i(\tau_1)U_n^1+\varphi_i(\tau_2)U_n^2\ i=1,2,3,4 \quad (6)$$

are the indirect variables, then the model of Equation (5) can be expressed in the form:

$$Y_n = B\Phi_n H_n \quad (7)$$

where $B=[(A_1S)(A_2S)(A_3S)(A_4S)]$ is a known matrix because $A_1$ to $A_4$ comprise fixed coefficients and $S$ is the known sync word.

In this context, in the receiver of FIG. 1 the indirect variable synchronization units 14A and 14B serve to produce initial values $\Phi_0^A$ and $\Phi_0^A$ respectively of the indirect variable vector $\Phi_n$ for synchronization, and the indirect variable tracking units 16A and 16B serve, in conjunction with the frequency offset indirect variable estimation unit 22, to track the indirect variable vector $\Phi_n$ throughout a time slot to produce tracked values $\Phi_n^A$ and $\Phi_n^B$ respectively. The linear indirect variable equalizer 18 comprises a Kalman filter which is controlled by the tracked values $\Phi_n^A$ and $\Phi_n^B$ of the indirect variable vector to combine and recursively filter the received signal samples $Y_n^A$ and $Y_n^B$, thereby producing a received and equalized signal vector $S_{\Theta,n}$. This vector is limited by the hard limiter 24, from the output of which the $K\Phi$ calculating unit produces a feedback control signal $K_{\Phi,n}$ for the tracking units and the demodulator 28 produces a demodulated signal on an output line 32 of the receiver. The various units of the receiver are further described below.

Figure 2:
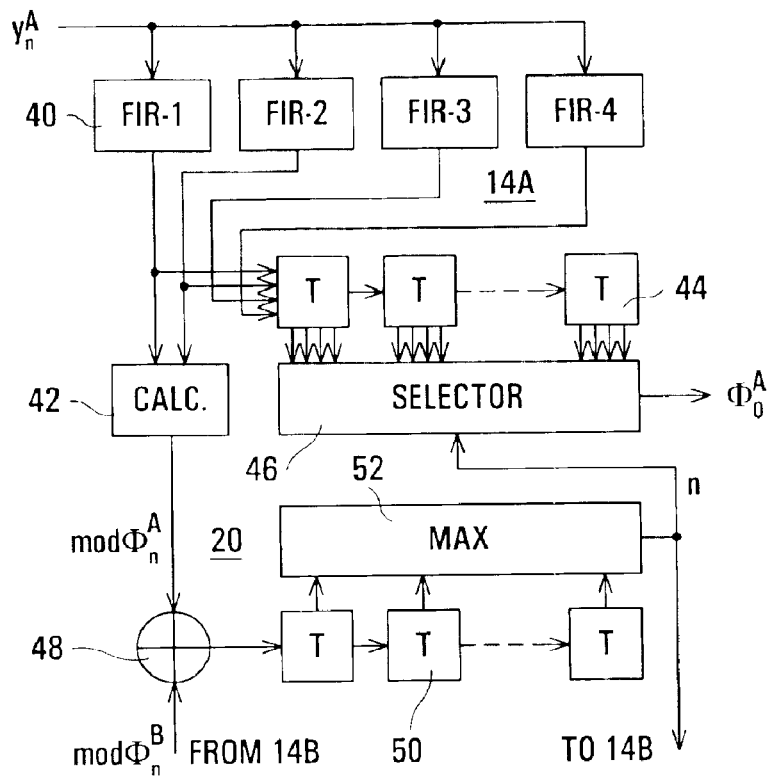
FIG. 2 schematically illustrates indirect variable synchronization and frame synchronization units of the receiver of FIG. 1.

FIG. 2 illustrates one form of the indirect variable synchronization unit 14A (the unit 14B is similar) and one form of the frame synchronization unit 20, for producing the initial value $\Phi_0^A$ for synchronization. The unit 14A comprises four finite impulse response (FIR) filters (FIR-1 to FIR-4) 40 which are supplied with the received signal samples $Y_n^A$, a calculation unit 42, a delay line 44 comprising delay elements each providing a delay of one symbol spacing interval T, and a selector 46. The frame synchronization unit 20 comprises a combiner 48, a delay line 50, and a maximum detector 52.

In order to simplify matrix inversion, the model of Equation (7) is divided into even and odd sample sets so that the model can be expressed as:

$$Y_n^{odd} = B_{odd}\Phi_n + H_n^{odd} \quad Y_n^{even} = B_{even}\Phi_n + H_n^{even}$$

and, because B is a known matrix, the indirect variable vector can be initially determined by a matched filtering represented by:

$$\Phi_n^{odd} = (B_{odd}^T B_{odd})^{-1} B_{odd}^T Y_n^{odd} \quad \Phi_n^{even} = (B_{even}^T B_{even})^{-1} B_{even}^T Y_n^{even}$$

in which the first three terms on the right-hand side of each equation can be pre-calculated and stored. It is observed that here and below the various signal processing operations produce results which are estimates rather than the precise values of the respective signals. In FIG. 2, the FIR filters 40 perform this matched filtering function, the filters FIR-1 and FIR-3 corresponding to the first and third rows respectively of the matrix $(B_{odd}^T B_{odd})^{-1} B_{odd}^T Y_n^{odd}$ and the filters FIR-2 and FIR-4 corresponding to the second and fourth rows respectively of the matrix $(B_{even}^T B_{even})^{-1} B_{even}^T Y_n^{even}$.

Consequently, the outputs of the FIR filters 40, which are supplied to inputs of the delay line 44, constitute the indirect variable vector $\Phi_n$ in accordance with the above model, but its synchronization, i.e. the value n which provides a reference timing point, is not yet determined. This is determined as described below using, for simplicity, only the first two of the approximation functions described above, the outputs of only the filters FIR-1 and FIR-2 being supplied to the calculation unit 42, which calculates and produces at its output a value $\text{mod}\Phi_n$. The calculation carried out by the unit 42 is dependent upon the particular approximation functions which are used as described above. For the functions $\Phi_1(\tau) = g(\tau)$ and $\Phi_2(\tau) = \tilde{g}(\tau)$ referred to above, for example, $$\text{mod}\,\Phi_n = \frac{[\varphi_2(\tau_n)\phi_{2,n} + \varphi_1(\tau_n)\phi_{1,n}]^T [\varphi_2(\tau_n)\phi_{2,n} + \varphi_1(\tau_n)\phi_{1,n}]}{\varphi_2(\tau_n)^2 + \varphi_1(\tau_n)^2}$$

where $$\tau_n = \frac{2}{\pi}\text{real}\left(\text{atan}\left(\frac{\phi_{2,n}}{\phi_{1,n}}\right)\right)$$

and the calculation unit 42 calculates $\text{mod}\Phi_n$ accordingly.

The values $\text{mod}\Phi_n^A$ and $\Phi_n^B$ thus produced for the two paths A and B are combined by the signal combiner 48 in the frame synchronization unit 20 to provide for frame alignment of the signals from the two antennas, and the output of the signal combiner is supplied to the delay line 50 having a length corresponding to the observation window of the received signal samples. The maximum detector 52 determines the value n corresponding to a maximum one of the outputs of the delay line 50, thereby determining synchronization, and supplies this to the selector 46 in the unit 14A. The selector 46 selects from the delay line 44 the corresponding indirect variable vector $\Phi_n$ and supplies this to its output as the initial indirect variable vector $\Phi_0^A$.

Figure 3:
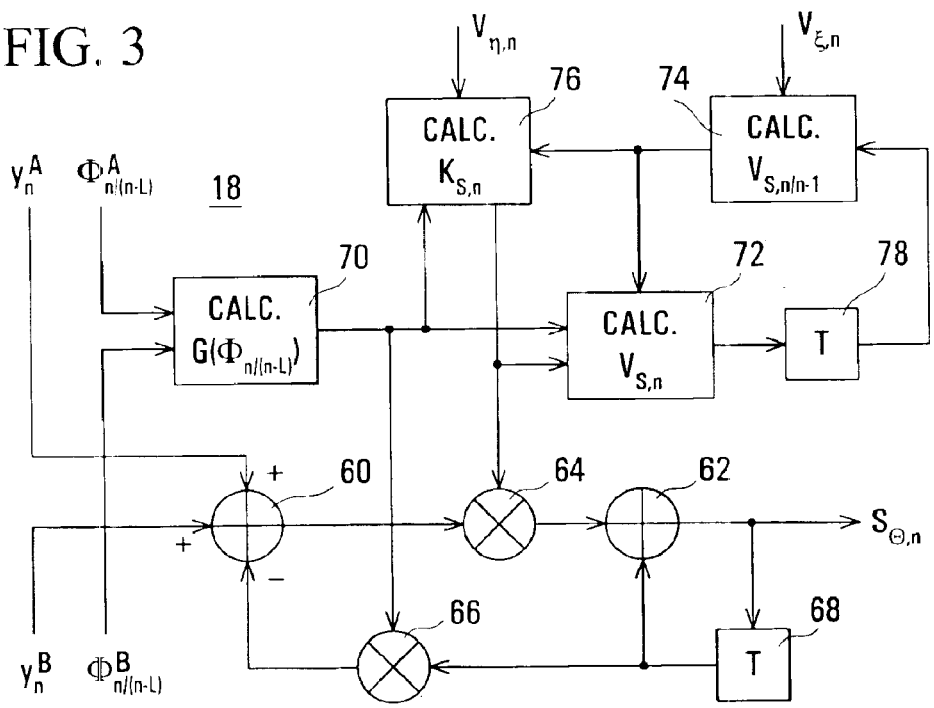
FIG. 3 schematically illustrates a linear indirect variable equalizer of the receiver of FIG. 1.

One form of the linear indirect variable equalizer 18 is illustrated in FIG. 3 and comprises a Kalman filter including signal combiners 60 and 62, multipliers 64 and 66, and a delay element 68, and an arrangement for determining filter parameters including calculation units 70, 72, 74, and 76 and a delay element 78. The arrangement and operation of the equalizer will be further understood from the following description.

With prediction of estimates to an n-th step at the step n-L, the Kalman filter in FIG. 3 can be seen to provide its output $S_{\Theta,n}$ in accordance with:

$$S_{\Theta,n} = A_n S_{n-1} + K_{S,n}(y_n - G(\Phi_{n/n-L})(A_n S_{n-1})) \quad (8)$$

where $K_{S,n}$ is a Kalman filter gain given by:

$$K_{S,n} = [V_{S,n/n-1}G(\Phi_{n/n-L})]G(\Phi_{n/n-L})'[V_{S,n/n-1}G(\Phi_{n/n-L})] + V_{\eta,n})^{-1}$$

$$V_{S,n/n-1} = A_n V_{S,n-1} A_n^T + V_{\xi,n} \quad (9)$$

$$V_{S,n} = V_{S,n/n-1} - K_{S,n}[V_{S,n/n-1}G(\Phi_{n/n-L})]$$

where the terms of these equations can be understood from the following description.

Extending a single antenna representation for the case of two antennas and hence two sampled signals, $$y_n \equiv \begin{bmatrix} y_n^A \\ y_n^B \end{bmatrix} = \begin{bmatrix} G(\Phi_n^A) \\ G(\Phi_n^B) \end{bmatrix} S_n + \begin{bmatrix} \eta_n^A \\ \eta_n^B \end{bmatrix}$$

where the last matrix represents equivalent noise including indirect variable errors. This noise has the covariance matrix:

$$V_\eta = \begin{bmatrix} 2\sigma_\eta^2 R_\eta + V_{\eta,\Phi} & 0_{2\times 2} \\ 0_{2\times 2} & 2\sigma_\eta^2 R_\eta + V_{\eta,\Phi} \end{bmatrix},$$

$$R_\eta = \begin{bmatrix} 1 & g(T/2) \\ g(T/2) & 1 \end{bmatrix}$$

where $V_{\Phi,n/n-L}=V_{\Phi,n-L}+Q_\Phi L$ is the covariance matrix of the indirect variable prediction error for L+1 steps, $Q_\Phi$ is the covariance matrix of exciting noise of the indirect variable vector, $$B(S) = \begin{bmatrix} S^T A_1^T \\ S^T A_2^T \end{bmatrix}, \quad G(\Phi_n) = \begin{bmatrix} \Phi_n^T A_1 \\ \Phi_n^T A_2 \end{bmatrix},$$

$A_1$ and $A_2$ are 4×(2m+1)-dimensioned approximation coefficient matrices as described above, and m is a number of adjacent symbols taken into account. A vector condition for TDMA symbols can be described by the equation $S_n=A_n S_{n-1}+\xi_n$ where $A_n$ is a shift matrix (or a transition matrix during the CDVCC) and $\xi_n$ is noise with covariance matrix $V_{\xi,n}=2Q_{\xi,n}$ which is a zero matrix during the CDVCC, thus when n is not in the CDVCC:

$$A_n = \begin{bmatrix} 0 & 1 & 0 & \ldots & 0 \\ 0 & 0 & 1 & \ldots & 0 \\ \ldots & \ldots & \ldots & \ldots & \ldots \\ 0 & 0 & 0 & \ldots & 1 \\ 0 & 0 & 0 & \ldots & 0 \end{bmatrix} \quad Q_n = \begin{bmatrix} 0 & 0 & \ldots & 0 \\ 0 & 0 & \ldots & 0 \\ 0 & 0 & \ldots & 1/2 \end{bmatrix}$$

and when n relates to a known CDVCC symbol $W_n$:

$$A_n = \begin{bmatrix} 0 & 1 & 0 & \ldots & 0 \\ 0 & 0 & 1 & \ldots & 0 \\ \ldots & \ldots & \ldots & \ldots & \ldots \\ 0 & 0 & 0 & \ldots & 1 \\ 0 & 0 & 0 & \ldots & w_n \end{bmatrix} \quad Q_n = \begin{bmatrix} 0 & 0 & \ldots & 0 \\ 0 & 0 & \ldots & 0 \\ 0 & 0 & \ldots & 0 \end{bmatrix}$$

Thus referring again to FIG. 3, the calculation unit 70 produces $G(\Phi_{n/n-L})$, used in the first and third of Equations (9) and in Equation (8), from the indirect variable vectors $\Phi_n^A$ and $\Phi_n^B$ tracked as described below, and the calculation units 76, 74, and 72 produce the values of respectively the first, second, and third of the Equations (9). $V_{\xi,n}$ supplied to the unit 74 is predetermined as indicated above, and $V_{\eta,n}$ supplied to the unit 76 can also be fixed and predetermined or, as later described below, can be adaptively changed. The Kalman filter gain $K_{s,n}$ is used by the multiplier 66 to produce, with the other elements 60, 62, 64, and 68 of the Kalman filter, the equalizer output vector $S_{\Phi n}$, from the signal samples $Y_n^A$ and $Y_n^B$ in accordance with Equation (8).

Figure 4:
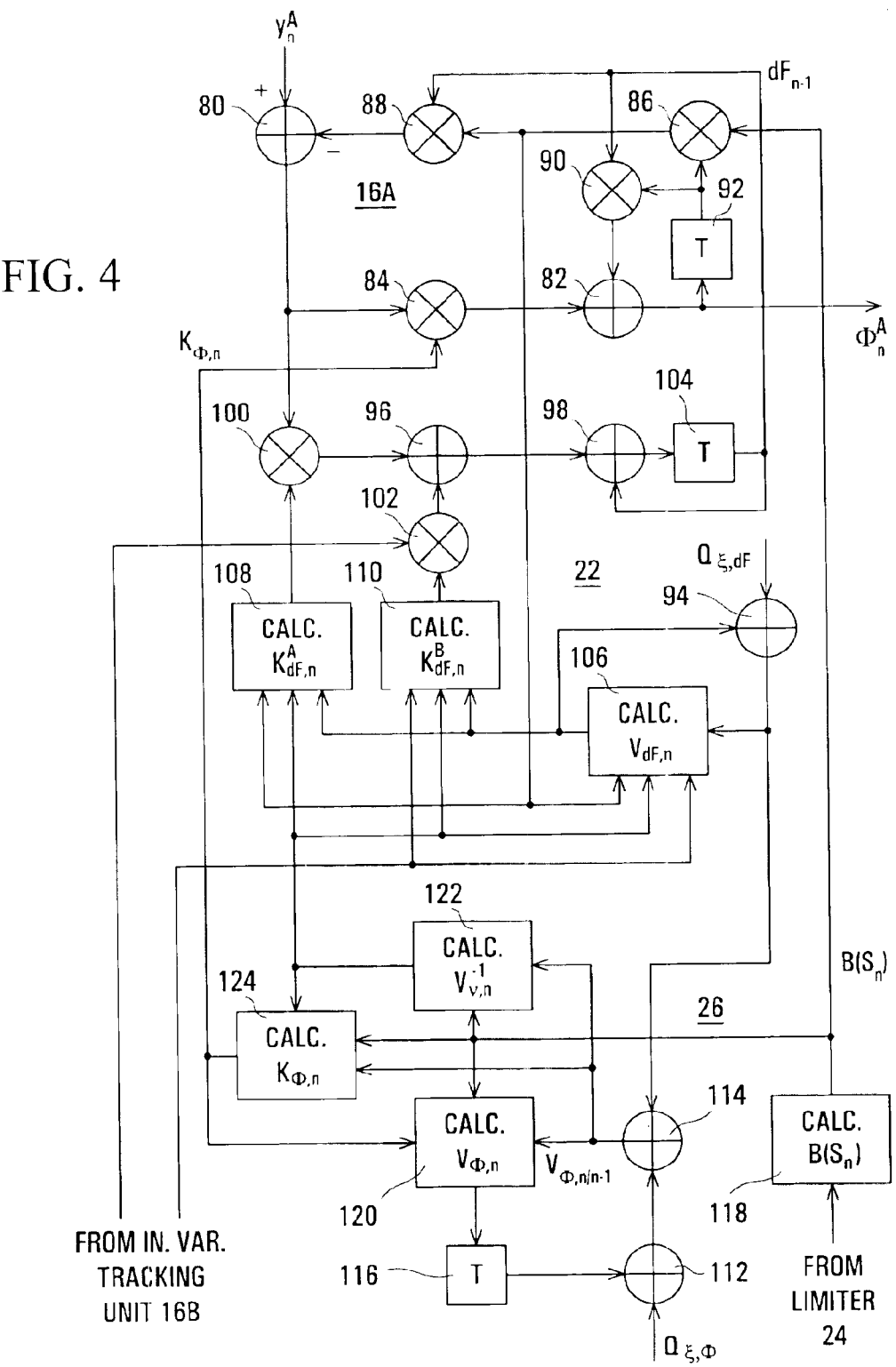
FIG. 4 schematically illustrates indirect variable tracking, frequency offset estimation, and KD units of the :receiver of FIG. 1.

Referring now to FIG. 4, one form of the indirect variable tracking unit 16A is illustrated, the unit 16B being similar and connections to it also being indicated in FIG. 4, together with one form of the frequency offset indirect variable estimation unit 22 and of the KΦ calculation unit 26. To some extent these units make use of similar calculations so that they are closely inter-related and they are accordingly described together below. As illustrated in FIG. 4, the indirect variable tracking unit 16A comprises signal combiners 80 and 82, multipliers 84, 86, 88, and 90, and a delay element 92. Although not shown separately in FIG. 4, the unit 16A is also supplied with the initial value $\Phi_0^A$ of the indirect variable vector $\Phi_n$ for synchronization by the unit 14A as described above. The frequency offset indirect variable estimation unit 22 comprises signal combiners 94, 96, and 98, multipliers 100 and 102, a delay element 104, and calculation units 106, 108, and 110. The KΦ calculation unit 26 comprises signal combiners 112 and 114, a delay element 116, and calculation units 118, 120, 122, and 124.

The effect of frequency offset in conjunction with indirect variable error ξ can be expressed by:

$$\Phi_n^A = dF_n \Phi_{n-1}^A + \xi_{\phi,n}^A$$
$$\Phi_n^B = dF_n \Phi_{n-1}^B + \xi_{\phi,n}^B \quad (10)$$
$$dF_n = dF_{n-1} + \xi_{dF,n}$$

where $dF_n \approx \exp(j2\pi f_{of} T)$ and $f_{of}$ is frequency offset. With an observation model of the form:

$$Y_n^A = B(S_n)\Phi_n^A + \eta_n^A, \quad y_n^B = B(S_n)\Phi_n^B + \eta_n^B$$

then if $dF_{n-1}$ is estimated very accurately, substituting the estimates for the actual variable in Equation (10) produces a model which does not depend upon this variable:

$$\Phi_n^A = \Phi_{n-1}^A + \xi_{\Phi,n}^A$$
$$\Phi_n^B = \Phi_{n-1}^B + \xi_{\Phi,n}^B \quad (10)$$

and results in a filtering algorithm:

$$\Phi_n^A = dF_{n-1}\Phi_{n-1}^A + K_{\Phi,n}(Y_n^A - B(S_n)\Phi_{n-1}^A dF_{n-1}) \quad (11)$$
$$\Phi_n^B = dF_{n-1}\Phi_{n-1}^B + K_{\Phi,n}(Y_n^B - B(S_n)\Phi_{n-1}^B dF_{n-1})$$

where $$K_{\Phi,n} = V_{\Phi,n/n-1} B(S_n)' V_{v,n}^{-1}$$
$$V_{v,n}^{-1} = (B(S_n) V_{\Phi,n/n-1} B(S_n)' + 2\sigma_\eta^2 R_\eta)^{-1} \quad (12)$$
$$V_{\Phi,n} = V_{\Phi,n/n-1} - K_{\Phi,n}[V_{\Phi,n/n-1} B(S_n)']$$
$$V_{\Phi,n/n-1} = V_{\Phi,n-1} + Q_{\xi,\Phi} + v_{dF,n-1}$$

It can be appreciated here that the same Kalman gain matrix $K_{\Phi,n}$ is used for signals from the two antennas, thereby simplifying the filtering algorithm and making its complexity independent of the number of antennas.

It can be seen from FIG. 4 that the elements 80 to 92 of the tracking unit 16A are arranged to implement Equation (11) for the signal samples $Y_n^A$, the parameter $dF_{n-1}$ being supplied from the output of the delay element 104 and the parameter $K_{\Phi,n}$ being supplied from the output of the unit 124, to produce the tracked indirect variable vector $\Phi_n^A$ at the output of the signal combiner 82. The four Equations (12) are implemented in FIG. 4 respectively by the calculation units 124, 122, and 120 and the elements 112 to 116.

For frequency offset estimation, the following approximated model is derived from the above:

$$dF_n = dF_{n-1} + \xi_{dF,n}$$
$$Y_n^A = B(S_n)\Phi_{n-1}^A dF_{n-1} + v_n^A$$
$$Y_n^B = B(S_n)\Phi_{n-1}^B dF_{n-1} + v_n^B$$

where $v_n^A$ and $v_n^B$ are equivalent observation noise which take into account estimation errors of the indirect variable vectors $\Phi_{n-1}^A$ and $\Phi_{n-1}^B$ and have the same covariance matrix defined by:

$$V_{v,n} = B(S_n) V_{\Phi,n/n-1} B(S_n)' + 2\sigma_\eta^2 R_\eta$$

Then an indirect variable filtering algorithm for $dF_n$ can be written in the form:

$$dF_n = dF_{n-1} + K_{dF,n}{}^A(Y_n{}^A - B(S_n))\Phi_{n-1}{}^A dF_{n-1}) + K_{dF,n}{}^B(Y_n{}^B - B(S_n))\Phi_{n-1}{}^B dF_{n-1}) \quad (13)$$

where $$K_{dF,n}{}^A = v_{dF,n}\Phi_{n-1}{}^{A\prime}B(S_n)'V_{v,n}{}^{-1}$$

$$K_{dF,n}{}^B = v_{dF,n}\Phi_{n-1}{}^{B\prime}B(S_n)'V_{v,n}{}^{-1} \quad (14)$$

$$v_{dF,n} = 1/[1/v_{dF,n/n-1} + \Phi_{n-1}{}^{A\prime}B(S_n)'V_{v,n}{}^{-1}B(S_n)\Phi_{n-1}{}^A + \Phi_{n-1}{}^{B\prime}B(S_n)'V_{v,n}{}^{-1}B(S_n)\Phi_{n-1}{}^B]$$

$$v_{dF,n/n-1} = v_{dF,n-1} + Q_{\xi,dF}$$

Although Equations (14) appear to be very complex, they can be implemented with low complexity because a large number of steps are already otherwise performed. For example, the inverse matrix $V_{v,n}{}^{-1}$ is used for calculation of $K_{\Phi,n}$, the differences in Equation (13) are the same as those in Equation (11), and multiplications such as $B(S_n)\Phi_{n-1}{}^A$ have been used for difference calculations.

It can be seen from FIG. 4 that the four Equations (14) are implemented by the calculation units 108, 110, and 106 and the signal combiner 94 respectively. The multipliers 100 and 102, signal combiners 96 and 98, and delay element 104 implement Equation (13).

Figure 5:
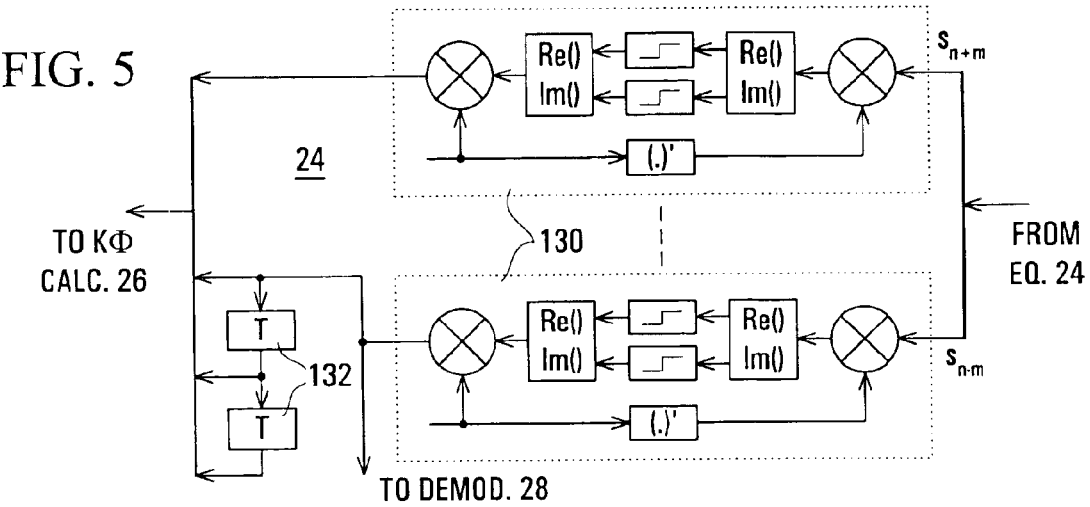
FIG. 5 schematically illustrates a hard limiter of the receiver of FIG. 1.

Referring to FIG. 5, the hard limiter 24 is supplied with the vector $S_{\Theta,n}$ from the output of the equalizer 18, and supplies the elements $S_{n+m}$ to $S_{n-m}$ of this vector via respective ones of 2m+1 stages 130 to produce hard limited elements which, with delayed versions thereof produced by delay elements 132, constitute the elements of the vector $S_n$ that is supplied to the $K\Phi$ calculation unit 26, and in particular to the unit 118 as shown in FIG. 4. In addition, the hard limiter 24 provides an output for the hard limited version of the element $S_{n-m}$ to the demodulator 28, which operates in a well-known manner for demodulating the π/4-shifted DQPSK signal. Each of the stages 130, as represented in FIG. 5 for two such stages, provides signal phase rotation, hard limiting, and derotation following the π/4-shifted DQPSK modulation rules.

In order to optimize parameters for operation of the receiver as described above, particular values can be selected. For example, the number 2m+1 of simultaneously estimated symbols in the equalizer 18 can be selected as being 5 with m=2, and with L=2 as already indicated the number of symbols m+1+L used in the tracking units 16A and 16B is also 5. The integration interval for the synchronization units can be 8 T, and in FIG. 4 $Q_{\xi,\Phi}$ can be (diag $(10^{-4}*[2\ 1\ 0.5\ 0.5])$, and $Q_{\xi,dF}$ can be $2.5*10^{-5}$. In addition, a fixed value of SNR, for example 17 dB, can be used for synthesizing the above algorithms, as the actual signal-to-noise and interference ratio may be unknown.

The receiver as described above is intended to provide an optimum performance in the presence of noise. However, in the presence of co-channel interference, the performance of the receiver can be degraded. In order to reduce or avoid such degradation, the receiver can also include the interference correlation matrix (ICM) estimation unit 30 shown in dashed lines in FIG. 1. This provides an adaptive control of the matrix $V_{\eta,n}$ which is supplied to the linear indirect variable equalizer 18, so that interference cancellation is also achieved by the operation of the equalizer as described above.

An analysis can be carried out in a similar manner to that described above in relation to the operation of the tracking units, but in respect of the information symbols $S_i$ in the TDMA time slot rather than the synchronization symbols, from which it can be determined that the noise covariance matrix $V_{\eta,n}$ provides interference cancellation based on differences of estimated values $\epsilon_i{}^A = Y_i{}^A - G(\Phi_i{}^A)S_i$ and $\epsilon_i{}^B = Y_i{}^B - G(\Phi_i{}^B)S_i$ which are already determined (Equation (8) above, using a slightly different notation) in the operation of the Kalman filter as described above. As illustrated in FIG. 1, these differences are supplied from the tracking units 16A and 16B to the ICM estimation unit 30 to enable estimation of the matrix $V_{\eta,n}$. This matrix is determined by:

$$V_\eta = 2R_\eta^{AB} = 2\begin{bmatrix} \sigma_A^2 R_\eta & r'_{AB}R_\eta \\ r_{AB}R_\eta & \sigma_B^2 R_\eta \end{bmatrix}$$

where $\sigma_A^2$ and $\sigma_B^2$ are unknown variances (real variables), $r_{AB}$ is an unknown correlation coefficient (complex variable), and $R_\eta$ is the known covariance matrix already specified above.

Figure 6:
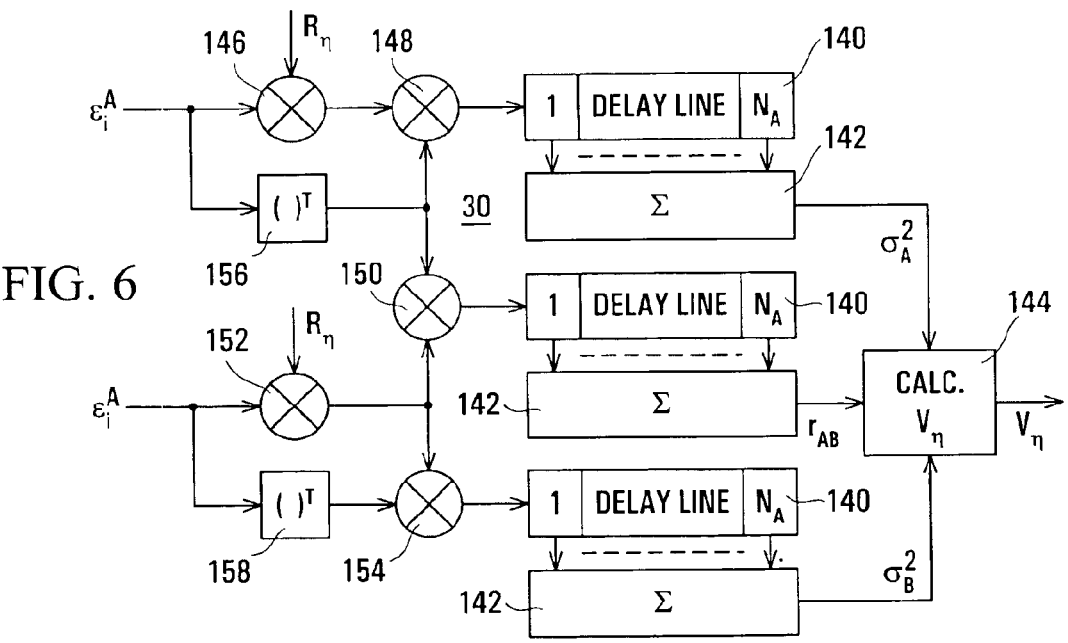
FIG. 6 schematically illustrates an optional interference correlation matrix estimator of the receiver of FIG. 1.

FIG. 6 illustrates one form of the ICM estimation unit 30, in which the unknowns $\sigma_A^2$, $\sigma_B^2$ and $r_{AB}$ are each averaged over a desired number NA of samples by respective delay lines 140 and summing units 142, the outputs of which are supplied to a calculation unit 144 to determine the covariance matrix $V_\eta$ in accordance with the above equation. The unit 30 also includes multipliers 146, 148, 150, 152, and 154, and transpose units 156 and 158, which serve to produce the elements of the matrix as inputs to the delay lines 140 for averaging. Thus it can be seen that this adaptive operation of the receiver adds very little complexity to the receiver, but can substantially improve the performance of the receiver in the presence of co-channel interference.

Figure 7:
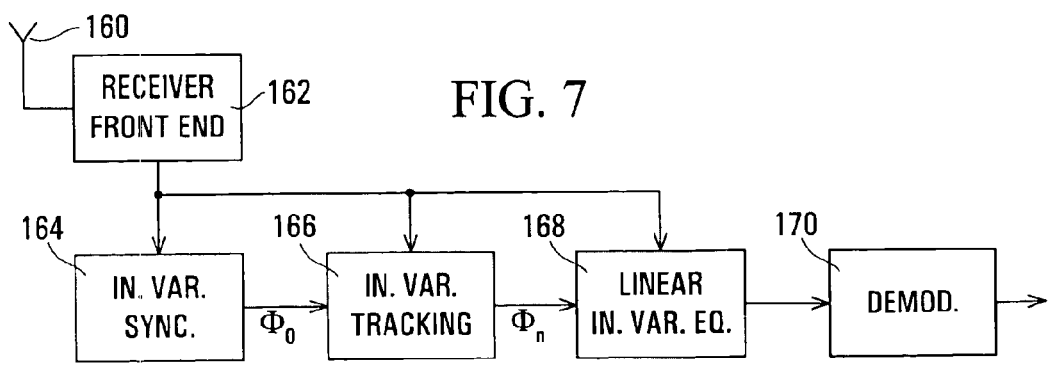
FIG. 7 schematically illustrates a single antenna TDMA cellular radio system receiver using indirect variables in accordance with another embodiment of the invention.

Although a dual antenna embodiment of the invention has been described above in detail, it should be appreciated that the invention is not limited in this respect, and it may also be applied to a single antenna receiver as illustrated in FIG. 7. Thus as shown in FIG. 7, a single antenna 160 is coupled via a receiver front end unit 162 whose output signal samples $Y_n$ are supplied to an indirect variable synchronization unit 164, an indirect variable tracking unit 166, and a linear indirect variable equalizer 168. The synchronization unit 164 provides an initial synchronization vector $\Phi_0$ to the tracking unit 166, no frame alignment being required because in this case there is only one signal path. The tracking unit 166 provides a tracked vector $\Phi_n$, and this is equalized by the equalizer 168 to produce a resulting signal for demodulation by a demodulator 170. It can be appreciated that the units 164, 66, and 168 in the receiver of FIG. 1 can use similar principles to those described above in order to provide improved single-antenna receiver performance through the use of indirect variables for all of the signal processing in the receiver prior to the demodulator.

It can be appreciated that although as described above the frequency offset estimation unit 22 is provided as is preferred to compensate for frequency offsets, which may be due to local oscillator frequency variations and, especially, due to Doppler effects, in other embodiments of the invention this unit can be omitted.

In addition, although the description above refers to, and the drawings illustrate, particular units such as calculation units, signal combiners, multipliers, delay elements, and so on, it should be appreciated that in practice the functions of all of these units can conveniently be carried out by one or more digital signal processors or application-specific integrated circuits.

Thus although particular embodiments of the invention have been described above, it can be appreciated that these and numerous other modifications, variations, and adaptations may be made without departing from the scope of the invention as defined in the claims.

What is claimed is:

1. A method of processing samples of a received signal to produce a demodulated signal, comprising the steps of:
   representing an impulse response matrix for the received signal using a plurality of indirect variables of a linear complex vector;
   synchronizing to the received signal samples in dependence upon the indirect variables;
   tracking the indirect variables for successive received signal samples;
   equalizing the successive received signal samples in dependence upon the tracked indirect variables; and
   producing the demodulated signal in response to the equalized received signal samples;
   wherein the step of synchronizing to the received signal samples comprises matched filtering the received signal samples to produce the plurality of indirect variables, and determining a maximum of a function of the indirect variables to determine synchronization.

2. A method as claimed in claim 1 wherein the received signal is a signal of a TDMA communications system.

3. A method as claimed in claim 1 wherein there are four indirect variables and said function is a function of only two of the indirect variables.

4. A method as claimed in claim 1 wherein the step of tracking the indirect variables for successive received signal samples comprises recursively filtering initial values of the indirect variables, established during the synchronizing step, in dependence upon the successive received signal samples.

5. A method as claimed in claim 4 wherein said indirect variables are produced and tracked individually in respect of samples of a received signal from each of two spaced antennas, and received signal samples from the two antennas are combined and equalized in dependence upon a combination of the indirect variables in respect of the two antennas.

6. A method as claimed in claim 1 wherein the step of tracking the indirect variables for successive received signal samples comprises a step of estimating frequency offset in dependence upon the successive received signal samples.

7. A method as claimed in claim 6 wherein said indirect variables are produced and tracked individually in respect of samples of a received signal from each of two spaced antennas, and received signal samples from the two antennas are combined and equalized in dependence upon a combination of the indirect variables in respect of the two antennas.

8. A method as claimed in claim 1 wherein the step of equalizing the successive received signal samples comprises adaptively changing an equalizer parameter in dependence upon tracking errors for successive received signal samples to reduce co-channel interference in the received signal.

9. A method as claimed in claim 8 wherein said indirect variables are produced and tracked individually in respect of samples of a received signal from each of two spaced antennas, and received signal samples from the two antennas are combined and equalized in dependence upon a combination of the indirect variables in respect of the two antennas.

10. A method as claimed in claim 1 wherein said indirect variables are produced and tracked individually in respect of samples of a received signal from each of two spaced antennas, and received signal samples from the two antennas are combined and equalized in dependence upon a combination of the indirect variables in respect of the two antennas.

11. An apparatus for producing a demodulated signal from samples of a received signal, comprising:
    a synchronization unit responsive to the received signal samples for producing a linear complex vector comprising a plurality of indirect variables having initial values corresponding to a synchronized state;
    a tracking unit responsive to the initial values of the indirect variables and to the received signal samples to produce tracked values of the indirect variables for successive received signal samples;
    an equalizer responsive to the tracked values of the indirect variables to equalize successive received signal samples;
    a feedback path from the equalizer to the tracking unit to facilitate producing the tracked values of the indirect variables by the tracking unit; and
    a demodulator responsive to the equalized received signal samples to produce a demodulated signal.

12. The apparatus as claimed in claim 11 wherein the synchronization unit comprises a plurality of finite impulse response filters for matched filtering of the received signal samples to produce the plurality of indirect variables.

13. The apparatus as claimed in claim 11 wherein the tracking unit comprises a recursive filter for recursively filtering the indirect variables in dependence upon the successive received signal samples.

14. The apparatus as claimed in claim 13 further comprising respective synchronization and tracking units for samples of a received signal from each of two spaced antennas, wherein the equalizer is responsive to the tracked indirect variables for both antennas to combine and equalize the received signal samples from the two antennas.

15. The apparatus as claimed in claim 11 further comprising a frequency offset estimator coupled to the tracking unit for modifying the tracking of the indirect variables in accordance with estimated frequency offset in dependence upon the successive received signal samples.

16. The apparatus as claimed in claim 15 further comprising respective synchronization and tracking units for samples of a received signal from each of two spaced antennas, wherein the equalizer is responsive to the tracked indirect variables for both antennas to combine and equalize the received signal samples from the two antennas.

17. The apparatus as claimed in claim 11 further comprising a unit, responsive to tracking errors determined by the tracking unit for successive received signal samples, for estimating an interference correlation matrix to adaptively change a parameter of the equalizer to reduce co-channel interference in the received signal.

18. The apparatus as claimed in claim 17 further comprising respective synchronization and tracking units for samples of a received signal from each of two spaced antennas, wherein the equalizer is responsive to the tracked indirect variables for both antennas to combine and equalize the received signal samples from the two antennas.

19. The apparatus as claimed in claim 11 further comprising respective synchronization and tracking units for samples of a received signal from each of two spaced antennas, wherein the equalizer is responsive to the tracked indirect variables for both antennas to combine and equalize the received signal samples from the two antennas.

* * * * *